United States Patent [19]

Marcade

[11] 4,112,588

[45] Sep. 12, 1978

[54] DRIER APPLIANCE CONTROL

[75] Inventor: Roque Denis Marcade, Stevensville, Mich.

[73] Assignee: Whirlpool Corporation, Benton Harbor, Mich.

[21] Appl. No.: 760,118

[22] Filed: Jan. 17, 1977

[51] Int. Cl.² ............................................. F26B 11/04
[52] U.S. Cl. .......................................... 34/45; 34/48; 34/53; 219/492
[58] Field of Search ............... 34/45, 48, 53; 219/491, 219/492, 493, 494; 432/37, 51; 68/15, 16

[56] References Cited

U.S. PATENT DOCUMENTS

| | | | |
|---|---|---|---|
| 3,254,421 | 6/1966 | Kielsmeier et al. | 34/12 |
| 3,597,139 | 8/1971 | Elders | 431/66 |
| 3,707,776 | 1/1973 | Scmidgall | 34/45 |
| 3,806,308 | 4/1974 | Cahoe et al. | 431/66 |
| 3,874,089 | 4/1975 | Offutt | 34/45 |
| 3,962,617 | 6/1976 | Offutt et al. | 34/45 |

*Primary Examiner*—John J. Camby
*Assistant Examiner*—Larry I. Schwartz
*Attorney, Agent, or Firm*—Wegner, Stellman, McCord, Wiles & Wood

[57] ABSTRACT

A control for use with a drier appliance arranged to provide maintained operating control voltage across the timer motor notwithstanding the series connection thereof with the electrical components of the heating apparatus of the drier appliance. The timer motor may be connected in series with a control switch and the electrical component of the heating apparatus may be connected in series with a thermostat switch. A capacitor is connected from between the timer motor and control switch to between the electrical component and thermostat switch for connecting the timer motor in series with the electrical component when the control switch is open. The series connection of the capacitor and timer motor is effectively shorted by the thermostat switch when the thermostat switch is closed. The capacitance of the capacitor is preselected to form with the inductance of the timer motor a series resonant circuit condition when the thermostat switch is open whereby the voltage across the timer motor is at least the minimum operating voltage thereof and the voltage across the electrical component of the heating apparatus is less than the minimum operating voltage to cause effective heating operation thereof.

8 Claims, 4 Drawing Figures

DRIER APPLIANCE CONTROL

BACKGROUND OF THE INVENTION

1. Field of the Invention

This invention relates to drier appliances and in particular to timer-controlled control means for use in drier appliances.

2. Description of the Prior Art

In Alvin J. Elders U.S. Pat. No. 3,597,139, owned by the assignee hereof, an improved dual coil gas burner control circuit is shown for use in a clothes drier or the like. The gas burners are fed from gas valves having electrical coil components connected in a circuit to be controlled by a timer-operated switch.

In U.S. Pat. No. 3,874,089 of Carl R. Offutt, which patent is also owned by the assignee hereof, a clothes drier control circuit is shown having a variable resistance connected in series with the timer motor of the drier control circuit. The variable resistance changes in response to heating to control the energization of the timer motor.

In U.S. Pat. No. 2,717,455 of John L. Harris et al, a drier control system is shown having means controlled conjointly by a timing means of the apparatus and thermostatic means thereof for preventing operation of the timing means until the thermostatic means reaches a "cold" position to permit operation of the heating means and then reaches a "hot" position to prevent operation thereof.

Robert L. Dunkelman, in U.S. Pat. No. 2,851,789, shows a control system for clothes dryers including a motor-driven timer, a heater cycling thermostat responsive to the temperature of inlet air entering the tumbling means from the heater and a second thermostat responsive to the temperature of the exhaust air leaving the tumbling means. The control is arranged to provide selectively continuous energization of the timer to provide a timed drying and tumbling operation. Alternatively, the timer may be controlled by the thermostat to provide a temperature-controlled operation.

Arthur Berendbaum, in U.S. Pat. No. 3,044,181, shows a heater control in a laundry apparatus wherein high heat is applied when the clothes are wet and lesser heat is applied as the moisture content of the clothes decreases.

In U.S. Pat. No. 3,254,421 of Elwood W. Kielsmeier et al., a method and apparatus for rapidly drying a sample of moist material is provided having a high heat timer and a total cycle timer. A capacitor is provided in the lead extending from a heating element to the high heat timer and to a variable voltage transformer.

Phillip L. Schmidgall, in U.S. Pat. No. 3,707,776, shows a control means for an inductance means wherein a resonant control means causes the voltage and current of an inductance drive means to be out of phase with each other so as to prevent operation of the inductance drive means. The electrical circuit is arranged so that an on-off operation of the inductance defined by the synchronous motor is effected by a resonant means which, when energized, causes the voltage-phase relationship of the inductance means to be out of phase so that the inductance means does not operate. The sensing means may be connected to a suitable appliance, such as an automatic clothes drier, to automatically control the on-off operation thereof.

In U.S. Pat. No. 3,806,308 of James R. Cahoe et al., a timer control circuit for a gas dryer is shown wherein operation of the timer may be dependent upon the condition of a solenoid-operated controlling valve assembly. In the summary portion of that patent it is stated that the timer control utilizes an ignition system of a gas burner to control timer run time to terminate a drying cycle. According to the disclosure of that patent the timer will run continuously throughout an automatic cycle except during periods when a control thermostat is closed and a radiant energy heat sensor switch is open.

SUMMARY OF THE INVENTION

The present invention comprehends an improved control for use in a drier appliance having a heating means including an electrical component, thermostatic switch means connected in series with the component for operating the heating means as an incident of the temperature sensed by the thermostat means being below a preselected temperature, a timer including a timer motor, and a control switch connected in series with the motor for causing operation of the timer. A capacitor is connected from between the timer motor and the control switch to between the thermostat means and the electrical component for connecting the timer switch in series with the electrical component when the control switch is open. The capacitor further effectively connects the timer motor with the thermostat switch means so that the series connection of the timer motor and the capacitor is effectively shorted out by the thermostat switch means when the thermostat switch means is closed to energize the electrical component.

The capacitance of the capacitor is preselected to form, with the inductance of the timer motor, a series resonant circuit condition when the thermostat switch means and the control switch are open wherein the voltage across the timer motor is at least a minimum operating voltage of the timer motor and the voltage across the electrical component is less than minimum operating voltage to cause effective heating operation thereof.

In the illustrated embodiment, the control switch is operated by the timer; and it is a feature of the invention that the timer motor is under power and runs continuously during the brief transition while the control switch is being closed or opened by the timer.

The invention permits the use of single throw thermostatic switch means eliminating the need for the back contacts of some prior art structures to provide the desired control of the heating means.

In the illustrated embodiment, the thermostat switch means includes a plurality of series-connected thermostat switches.

The voltage across the timer motor in the series resonant circuit condition may be greater than the supply voltage across the series-connected timer motor, capacitor and electrical component.

The heating means may selectively comprise a gas burner means controlled by a suitable electrical coil defining the electrical component thereof. Alternatively, the heating means may comprise an electrical resistor.

A centrifugal switch may be connected in series with the electrical component of the heating means for preventing operation of the heating means in the absence of the operation of a motor or the like which may cause rotation of a tumbling receptacle. The series connection of the centrifugal switch and the electrical component may be connected in parallel with the series connection of the capacitor and control switch.

In the disclosed embodiment of the invention the timer motor will run, during periods when the control switch is open, when and only when the thermostatic switch means is in the open condition.

The drier appliance control means of the present invention is extremely simple and economical of construction while yet providing the improved functioning as discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
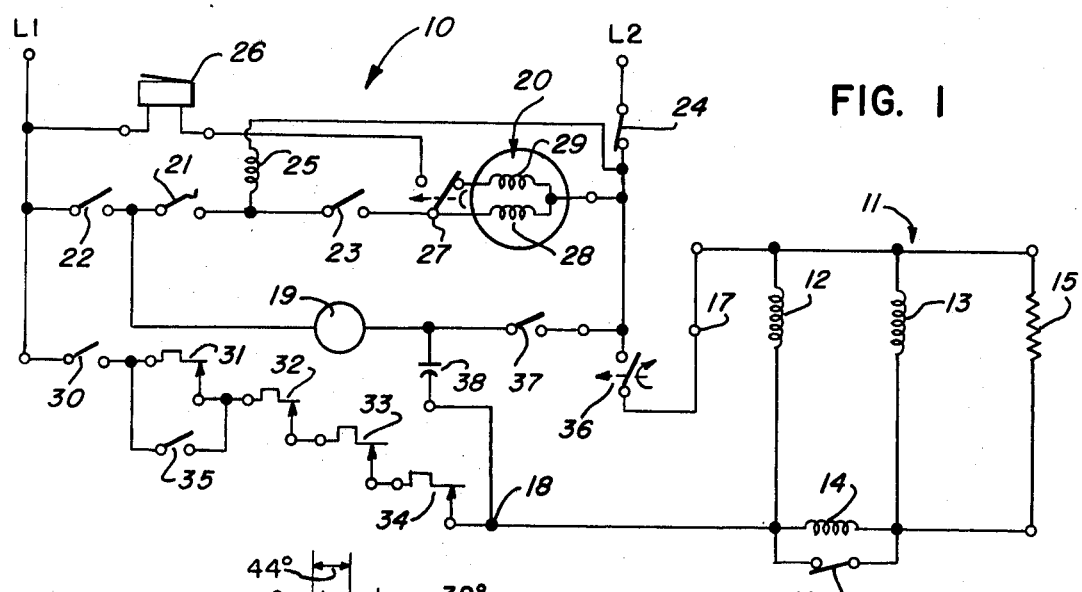
FIG. 1 is a schematic wiring diagram illustrating an improved drier appliance control means embodying the invention.
Figure 2:
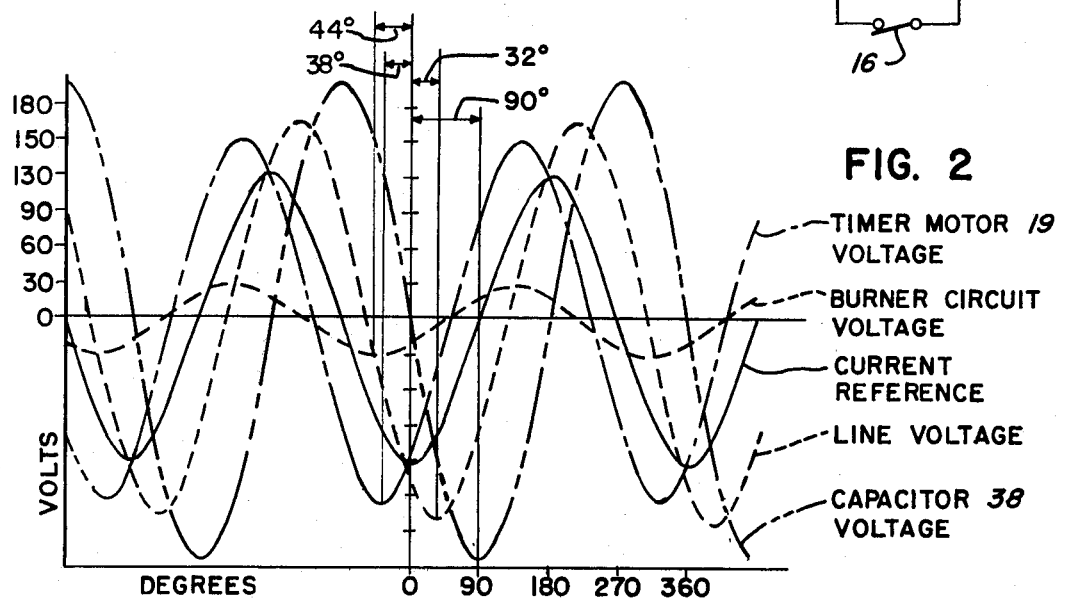
FIG. 2 is a voltage phase relationship diagram illustrating the functioning of the control of FIG. 1.
Figure 3:
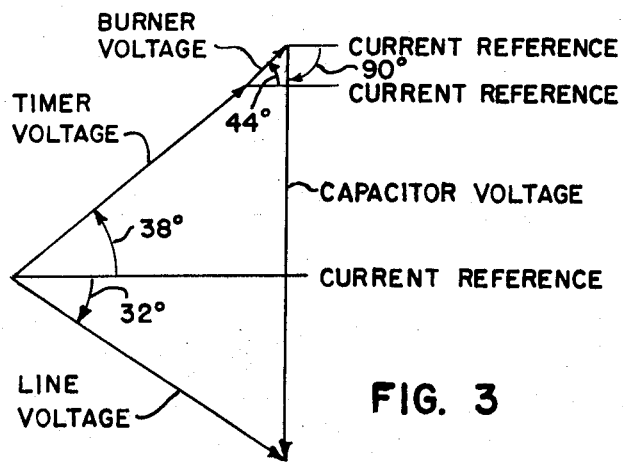
FIG. 3 is a voltage phasor diagram illustrating the functioning thereof.

In the exemplary embodiment of the invention as disclosed in FIGS. 1-3 of the drawing, an improved control circuit generally designated 10 is shown for use in controlling electrical component means generally designated 11 of the heating means of an electrical appliance, such as a clothes drier. In the illustrative embodiment of FIG, 1, the heating means comprises a gas burner means having a plurality of coils 12 and 13, a valve solenoid coil 14, and an igniter 15. A sensor switch 16 may be provided in parallel with solenoid coil 14. The heating control or electrical component means 11 is shown as a burner control and may be connected between a pair of terminals 17 and 18 of the control circuit 10.

A burner control circuit for a gas burner suitable for use in an electrical appliance incorporating the present invention is disclosed in the patent to Elders, U.S. Pat. No. 3,597,139, cited previously. That patent may be referred to for a more detailed understanding of such a gas burner and its operation with the circuitry of the present invention, and that patent is fully incorporated herein by reference.

The control circuit may be energized from a conventional power supply, such as including power supply leads $L_1$ and $L_2$, and may comprise a conventional 120 v., 60-cycle alternating current supply.

The control includes a timer motor 19 and a drive motor 20. A manually operable single pole, single through switch 21 is connected in series with a first timer switch 22, a second timer switch 23, and drive motor 20. The drier may include a single pole door switch 24 in the power supply $L_2$ for preventing operation of the drier whenever the door to the drier chamber is open.

Switch 21 may comprise a push-to-start relay switch having an associated relay coil 25 connected in parallel with the series connection of switch 23 and drive motor 20. A suitable buzzer 26 may be connected from power supply lead $L_1$ to a single pole, double throw switch 27 selectively connecting the windings 28 and 29 of the drive motor in parallel, or connecting the buzzer through solely energized winding 28.

A third timer switch 30 is connected in series with a plurality of single pole thermostat switches 31, 32, 33, and 34. A single pole "knit" switch 35 may be connected in parallel with thermostat switch 31. The series connection of the thermostat switches and timer switch 30 may be connected between power supply lead $L_1$ and terminal 18.

A centrifugal switch 36 may be connected between terminal 17 and door switch 24.

Timer motor 29 is connected to $L_1$ through switch 22 and is connected through a fourth timer switch 37 to the door switch 24. A capacitor 38 is connected from between timer motor 19 and timer switch 37 to between thermostat switch 34 and heating control 11.

Thus, when the control switch shown as timer switch 37 is closed, a timed drying cycle is obtained wherein the timer motor 19 is caused to run continuously from the beginning to the end of the drying cycle.

When, however, control switch 37 is opened, permitting the series-connected thermostat switches 31–34 to control the operation of the timer motor 19, an automatic sensed mode of operation is provided. More specifically, in the automatic mode of operation, timer switches 22 and 30 are closed. Thus, when all of the thermostat switches 31–34 are closed, the series connection of timer motor 19 and capacitor 38 is effectively shunted, thereby preventing operation of the timer while the heating means is energized. Consequently, the timer motor accumulates time during the automatic portion of the cycle only when one or more of the thermostat switches is open.

Capacitor 38 is preselected to permit the timer motor 19 to operate when the timer motor is effectively connected in electrical series with the heating control portion 11. Thus, the capacitor 38 permits the timer motor 19 to operate under such an open thermostat switch condition notwithstanding the fact that the electrical components of circuit portion 11 would, in the absence of the use of the capacitor 38, cause the voltage across the timer motor to be too low to cause timing operation thereof. More specifically, the capacitor 38 has a preselected capacitance coordinated with the inductance of the timer motor 19 to provide a series resonant circuit therewith causing a voltage across the timer motor of a value sufficient to cause running operation of the motor notwithstanding the series connection thereof with the electrical components of circuit portion 11. Illustratively, while the voltage drop across the electrical circuit portion 11 may be as high as 30% of the line voltage between power supply leads $L_1$ and $L_2$, the resonant circuit condition causes the voltage across the timer motor 19 to be approximately line voltage or greater so as to permit the operation of the timer motor, as indicated above. At the same time, the relatively low voltage appearing across the circuit portion 11 precludes operation of the heating means.

In one specific embodiment of the invention, the timer motor was a Mallory M001 timer motor, capacitor 38 had a 0.525 microfarad capacitance and was rated at 400 volts, with the burner apparatus comprising a White-Rodgers single level split coil burner assembly Part No. 25K39A-36E2. The peak voltages measured across the different components were as follows: across the timer motor — 155 volts with the phase angle of the current reference 38 degrees lagging; across the burner apparatus — 30 volts with the phase angle of the current reference 44 degrees lagging; across the capacitor — 205 volts with the phase angle of the current reference 90° leading; and across the line — 169 volts with the phase angle of the current reference 32° leading. These relationships are illustrated in FIGS. 2 and 3.

More specifically, as can be determined from FIG. 2, the sum of the instantaneous voltages across the timer motor 19, the capacitor, and the burner circuit is equal to the line voltage.

Referring to FIG. 3, as shown therein, the vector sum of the component voltages equals the line voltage. As shown therein, the length of each vector is proportional to the magnitude of the voltage and the angle relative to the current reference is the angle by which each of the voltages leads or lags the current reference.

Thus, as shown in FIGS. 2 and 3, the use of capacitor 38 in the improved control 10 provides a phase shift and voltage modification providing to the timer motor 19 sufficient voltage at all times to maintain operation thereof notwithstanding the series connection of the motor 19 through the burner control 11 to the power supply lead $L_2$. At the same time, capacitor 38 assures the dropping of the voltage across the burner circuit portion 11 to a voltage below that at which the burner circuit portion effects a heating operation.

The use of capacitor 38 to effect the desired control of the circuit provides improved functioning in allowing wide variations in line voltage and component impedances while yet assuring the desired operation as discussed above.

Figure 4:
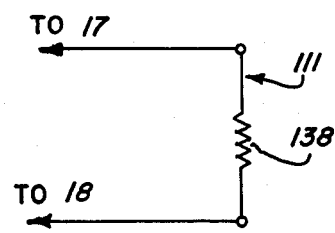
FIG. 4 is a fragmentary schematic wiring diagram illustrating the use of an electrical resistance heater as the heating means of the appliance in lieu of the gas burner heating means of the FIG. 1 embodiment.

Referring now to FIG. 4, the invention further comprehends the utilization of other electrical components in lieu of the circuit portion 11. Thus, as shown in FIG. 4, the heating means may comprise a heating resistor 138 connected between terminals 17 and 18 to form a modified heating circuit portion 111. In the illustrated embodiment, the heating resistor comprises a 120-volt, 1400-watt resistor. With the line voltage between power supply leads $L_1$ and $L_2$ being 120 volts RMS, the peak voltage across timer motor 19 was measured at 121.9 volts, the voltage drop across the capacitor 38 was 162 volts (the capacitor comprising a 0.525 microfarad capacitor), and the voltage drop across the resistor heater was 0.30 volts.

In permitting the use of relatively inexpensive single pole thermostatic switches, improved functioning of control 10 may be provided by means of utilization of two safety switches 33 and 34, each of which effects timing operation of motor 19 as discussed above upon the opening thereof. Thus, the present invention offers a further advantage over the prior art structures wherein less than all of the safety thermostat switches were adapted to effect operation of the timer motor upon opening thereof.

It is often desirable, in a drier cycle, to combine an automatic or sensed mode of operation with a continuously timed mode. For example, in many drier cycles a sensed drying mode is often followed by a cool down mode of fixed duration during which the items being dried are tumbled in the absence of heat from the heating apparatus. The drier control circuit shown in FIG. 1 is ideally suited for providing any desired combination of automatic sensed and continuously timed modes in a total drier cycle.

When this circuit is used in such a multi-mode cycle the timer motor will be under power and run continuously during the transition period between consecutive modes. The timer motor circuit, during run periods in the sensed mode, includes switch 22, timer motor 19, capacitor 38, heating apparatus 11, centrifugal switch 36, and door switch 24. During continuously timed modes the timer motor circuit includes switch 22, timer motor 19, control switch 37, and door switch 24. It is thus apparent that the timer motor will never stall between modes inasmuch as one or the other of these timer motor circuits will always be available for applying power thereto. That is, the timer motor will be under the control of the thermostats until the instant that the contacts of control switch 37 are actually closed, and conversely operation of the timer motor will be under the control of the thermostats the instant the contacts of control switch 37 open.

Thus, the improved control 10 provides for imposed functioning of the drier appliance while at the same time minimizing the cost thereof. The improved control circuitry is extremely simple and thus provides further for reduced maintenance and long life.

The foregoing disclosure of specific embodiments is illustrative of the broad inventive concepts comprehended by the invention.

The embodiments of the invention in which an exclusive property or privilege is claimed are defined as follows:

1. In a drier appliance having a heating means including an electrical component, thermostat switch means connected in series with said component for operating said heating means as an incident of the temperature sensed by said thermostat means being below a preselected temperature, a timer including a timer motor, a control switch connected in series with the motor for controlling operation of the timer, and means for electrically connecting the appliance to a power supply having a preselected voltage for effecting operation of the appliance, the improvement comprising a capacitor connected from between said timer motor and said control switch to between said thermostat means and said electrical component for connecting said timer motor in series with said electrical component through said capacitor when the control switch is open, said capacitor further connected between the timer motor and the thermostat switch means with said timer motor and said capacitor being effectively shorted by the thermostat switch means when the thermostat switch means is closed to energize said electrical component, said series arrangement of the timer motor, capacitor, and electrical component being connected to have the power supply voltage applied thereacross when the thermostat switch means and control switch are open, the capacitance of said capacitor being preselected to form with the inductance of said timer motor a series resonant circuit condition when said thermostat switch means and said control switch are open wherein the voltage across said timer motor is at least the minimum operating voltage of said timer motor and the voltage across the electrical component is less than the minimum operating voltage necessary to cause effective heating operation of said heating means.

2. The drier appliance of claim 1 wherein said thermostat switch means includes a plurality of series-connected thermostat switches whereby the opening of any one of said thermostat switches when said control switch is open places said timer motor and capacitor in said series resonant circuit condition.

3. The drier appliance of claim 1 wherein said voltage across the timer motor in said series resonant circuit condition is greater than the supply voltage across the series-connected timer motor, capacitor, and electrical component.

4. The drier appliance of claim 1 wherein said heating means includes a gas valve and said electrical component comprises electrical coil means for selectively operating said gas valve.

5. The drier appliance of claim 1 wherein said heating means comprises an electrical heater resistor.

6. The drier appliance of claim 1 wherein said thermostat switch means comprises a single throw thermostat switch.

7. The drier appliance of claim 1 wherein the drier includes a drum for tumbling items to be dried and drive means for rotatably driving said drum and wherein a centrifugal switch is connected in series with said electrical component for preventing operation of the heating means whenever said drive means is inoperative.

8. The drier appliance of claim 7 wherein the series connection of said centrifugal switch and said electrical component is connected in parallel with the series connection of said capacitor and control switch when said thermostat switch means is closed.

* * * * *